US005562927A

United States Patent [19]

Masuda et al.

[11] Patent Number: 5,562,927

[45] Date of Patent: Oct. 8, 1996

[54] SOAP FORMING TOY

[75] Inventors: Rumi Masuda; Yuji Yamane, both of Tokyo, Japan

[73] Assignee: Tomy Company Ltd., Tokyo, Japan

[21] Appl. No.: 493,617

[22] Filed: Jun. 22, 1995

[30] Foreign Application Priority Data

Jul. 11, 1994 [JP] Japan .............................. 6-009458 U

[51] Int. Cl.$^{6}$ .............................................. B29C 39/36

[52] U.S. Cl. ......................... 425/98; 425/107; 425/305.1; 425/DIG. 57; 249/115; 434/81; 434/82

[58] Field of Search ............................ 425/DIG. 57, 297, 425/302.1, 305.1, 98; 249/134, 115, 102, 55; 434/82, 81, 103

[56] References Cited

U.S. PATENT DOCUMENTS

| | | | |
|---|---|---|---|
| 3,574,904 | 4/1971 | Mazzoni | 425/298 |
| 3,598,358 | 8/1971 | Clearwaters | 425/DIG. 57 |
| 3,921,801 | 11/1975 | Sway | 425/DIG. 57 |
| 4,215,843 | 8/1980 | Gray et al. | 425/DIG.57 |
| 4,769,193 | 5/1988 | Marchesani | 425/296 |
| 5,088,598 | 2/1992 | Iguchi | 425/DIG. 57 |
| 5,401,152 | 3/1995 | Jacino et al. | 425/12 |

*Primary Examiner*—Khanh P. Nguyen
*Attorney, Agent, or Firm*—Staas & Halsey

[57] ABSTRACT

There is disclosed a soap forming toy including a shaving mechanism for removing thin leafs or small pieces from an existing piece of solid soap. The thin leafs of solid soap are then mixed with water to produce a paste-like soap material. The paste-like soap material is then molded into a variety of appealing shapes to produce new bars of soap of interest to the child. The cavity of each of the molds is made from a soft resin which includes a mold release oil to simplify removing the new bar of soap.

5 Claims, 3 Drawing Sheets

SOAP FORMING TOY

BACKGROUND AND SUMMARY OF INVENTION

The present invention relates to a toy for forming a bar of soap and includes a mechanism for shaving thin leafs from existing soap, utensils for mixing the thin leafs of shaved soap with water to form a paste-like soap material and a variety of molds of different configuration for receiving the paste-like soap material to form the new bars of soap.

Soaps of special shapes such as animals, flowers, etc. are readily available and are usually of initial interest to children. However, the aesthetic appeal of bars of soap of special shape is reduced as the configuration which originally was attractive to the child is worn away as the soap is used. Thus, while the child may be encouraged to use a bar of soap of interesting appearance, the interest of the child quickly declines as the bar of soap is used and loses the shape which originally attracted the child's attention.

With the present invention the child is permitted to reform old soap into new and exciting bars of new soap by shaving a solid piece of used soap into thin leafs and thereafter mixing these leafs with water to produce a paste-like soap material which may then be poured into a series of molds to produce new, exciting soap shapes.

Thus, a piece of solid soap no longer recognizable in its original configuration is removed from use and shaved into thin leafs and thereafter mixed with water to form a soap material which is introduced into any number of different mold cavities to produce a new piece of soap attractive to the child and which because of its attractiveness encourages the child to take further baths so that the process of producing a new soap can be repeated.

DESCRIPTION OF THE PREFERRED EMBODIMENTS

Figure 1:
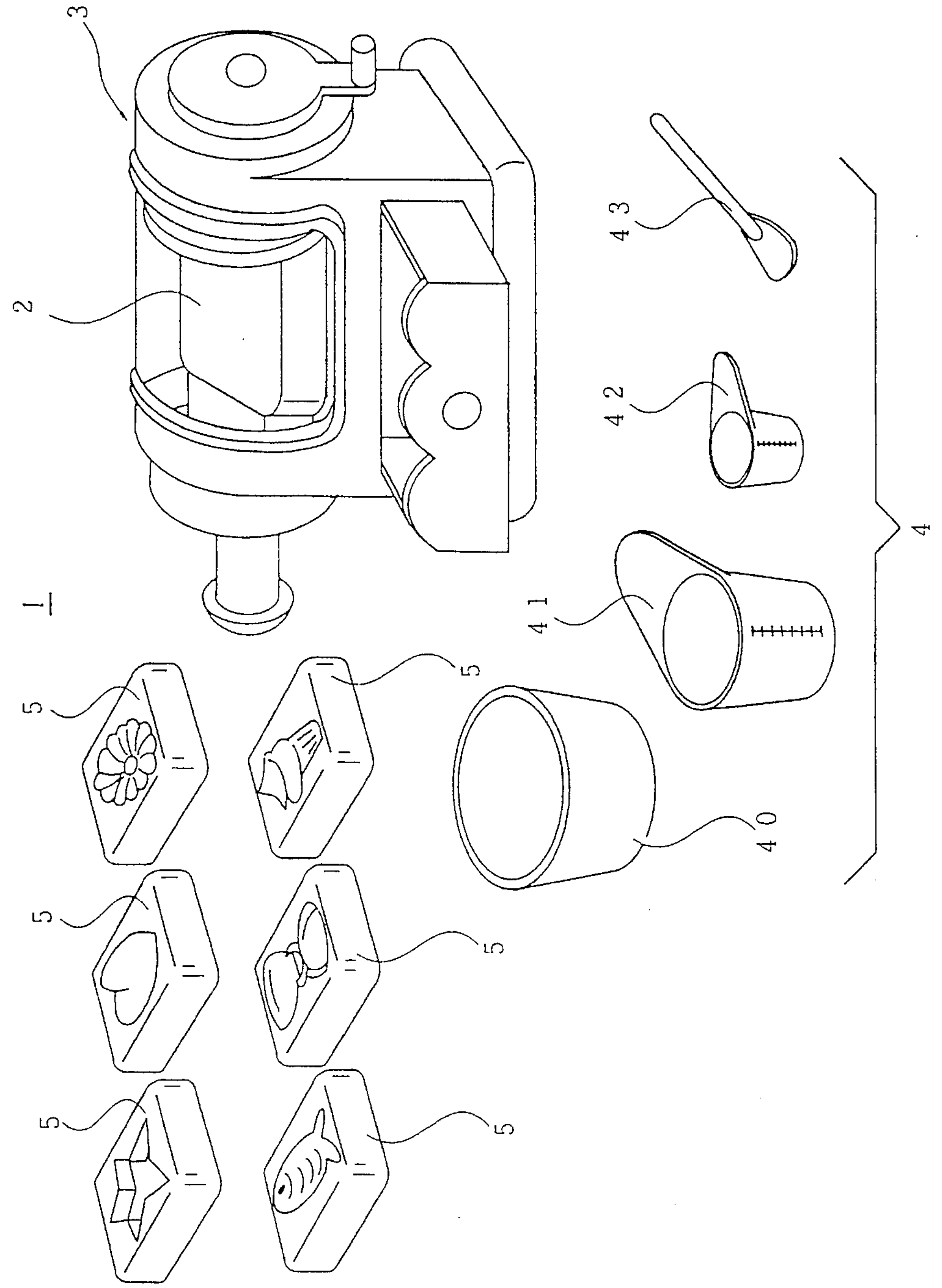
FIG. 1 is a perspective view of the parts of the soap forming toy of the present invention.

The soap forming toy of the present invention is illustrated in FIG. 1 and consists of a shaver generally designated by the reference numeral 3 which is used to shave a piece of solid soap 2 into thin leafs, a mixing appliance generally designated by the reference numeral 4 for mixing the shaved thin leafs into a paste-like soap material, and a plurality of molds generally designated by the reference numeral 5 for molding the soap material into new bars of soap of varying shapc.

Figure 2:
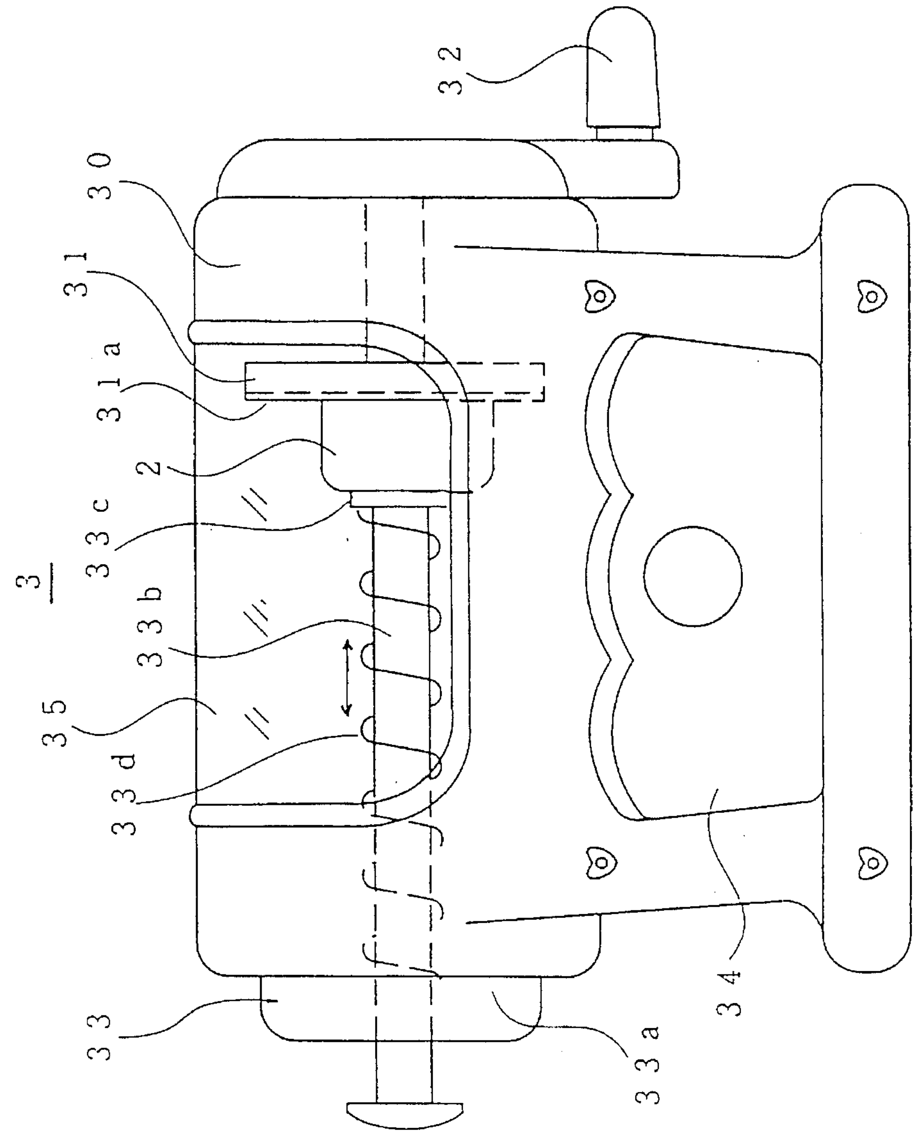
FIG. 2 is a front elevational view of the shaver.
Figure 3:
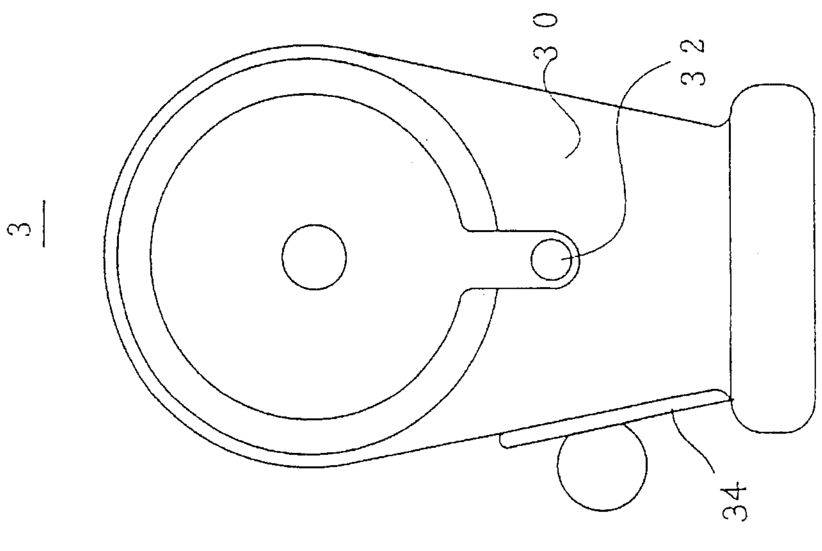
FIG. 3 is a side elevational view of the shaver.

With reference to FIGS. 2 and 3, the shaver 3 is provided with a main body 30 having a disk 31 with a cutting edge portion **31*a* for shaving the solid soap 2. A handle 32 is provided for rotating the disk 31. The guide 33 presses the solid soap 2 against the disk 31**.

On the lower portion of the main body 30, there is provided a drawer 34 for receiving the thin leafs of solid soap 2. The main body 30 is also provided with a transparent window 35 which is generally arch-like in configuration. Thus, the child is able to view the condition of the solid soap 2 at all times and may follow the exciting progress of the shaving of the soap 2.

The guide 33 is provided with a guide cap **33*a* mounted on the main body 30. The shaft 33*b* passes through the spring guide cap 33*a* and is movable. The pressing plate 33*c* is disposed on one end of the shaft 33*b* while the spring 33*d* is positioned between the pressing plate 33*c* and the spring guide cap 33*a*. It will be apparent from FIG. 2 that the spring 33*d* is wound around the shaft 33*b***.

The solid soap 2 is inserted by the child through an opening in the main body 30 which is formed when the guide 33 is removed from the main body 30. The guide 33 is attached to the main body 30 and then the solid soap 2 is positioned between the pressing plate **33*c* and the disk 31 under pressure of the spring 33*d*. When the handle 32 is rotated, the solid soap 2 is thereby shaved and the thin leafs of soap drop into the drawer 34**.

The mixing appliance 4, as seen in FIG. 1, may be of many configurations but in the preferred embodiment consists of a bowl 40 which is used to mix the leafs of the solid soap 2 with water. There are provided large and small cups 41 and 42 for measuring the thin leafs of solid soap 2 and water and a spatula 43 for mixing the thin leafs of the solid soap 2 and the water in the bowl 40. A paste-like soap material is produced by mixing the thin leafs of solid soap 2 and the water. The water content by weight under optimum condition ranges 5–20% while the preferred constituency is approximately 10%.

Also with reference to FIG. 1, the molds 5 will now be described. The molds 5 are preferably produced from a transparent soft resin, and in particular, a resin mixed with silicon master pellets containing dimethylpolysiloxane which is a mold oil release. Since the mold release is difficult with respect to the forming of soap, it is helpful that the requisite mold release oil be part of the material of which the mold 5 is made. At an optimum the mold release oil content by weight is 0.1–5%, and in the preferred embodiment approximately 1%. The mold 5 is preferably transparent such that the condition of the soap material therein can be observed easily.

Figure 4:
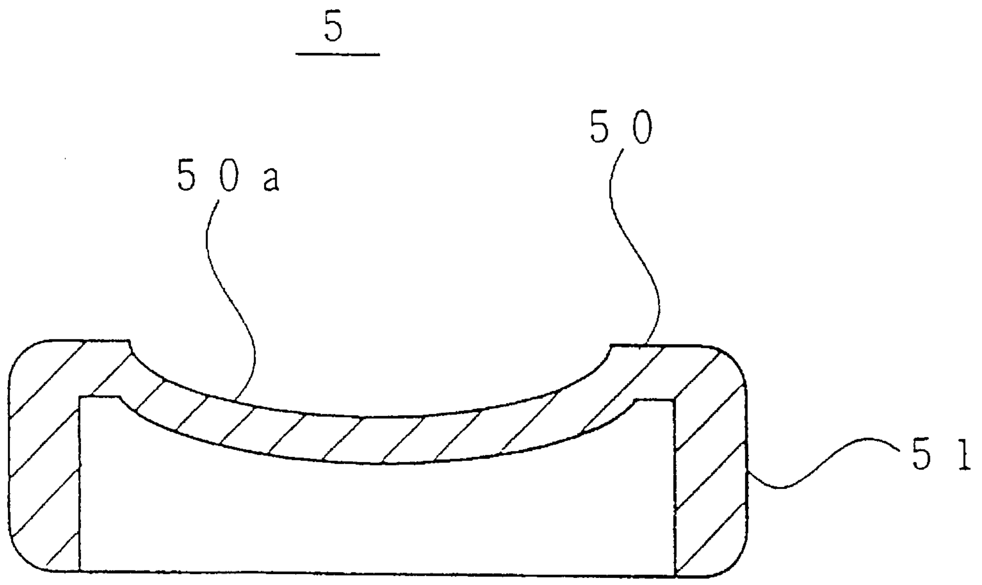
FIG. 4 is a sectional view of a sample mold.

As seen in FIG. 4, the mold 5 includes a base 50 having a cavity **50*a* therein and downwardly extending leg portions 51 formed continuously along the lower portion of the base 50 on all sides thereof. It will be apparent from FIG. 1 that the cavities 50*a* of the various bases 50 are different for each mold shape. As seen in FIG. 1, for example, the cavity 50*a* may be formed as a star, a heart, a flower, an ice cream cone, a fish and the like. Since various sizes, shapes and patterns are possible the new bars of soap will be of particular interest to children. The downwardly extending leg portions 51, being disposed on the lower side of the base 50, also provides the necessary stability when the molds 5** after having been filled are placed on a flat surface.

The operation of the soap forming toy of the present invention will now be described. The spring guide cap **33*a* is loosened by rotation detaching the guide 33 from the main body 30. Then, a piece of solid soap 2 is positioned within the main body 30. The guide 33 is attached to the main body 30 by rotating the spring guide cap 33*a* into the main body 30. The solid soap 2 is pressed into the disk 31 because of the force of the spring 33*d* and the pressing plate 33*c***.

When the handle 32 is rotated, the disk 31 also rotates such that the solid soap 2 is shaved into thin leafs by the blades formed on the face of the disk 31. The thin leafs of solid soap 2 that have been shaved drop into the drawer 34.

The thin leafs of solid soap are placed in one of the cups 41 and 42 and then dropped into the bowl 40 in predetermined amounts. The amount of water may be measured by the light cup and also poured in predetermined amounts into the bowl 40. Thereafter, the spatula 43 is used to mix the thin leafs of soap and the water in the bowl 40. A paste-like soap material is formed by this process.

Thereafter, the resulting soap material is poured into the cavity 50 with the aid of the spatula 43. As the water evaporates to a certain degree, the rear side of the cavity 50 is pressed by the finger and the resulting, semi-solidified soap is removed from the mold 50 for drying. Since each of the molds 50 contains mold release oil, the paste-like solid soap material is easy to remove.

From the foregoing, it will be apparent that the interest of the child is maintained by producing new bars of soap of varying appearance while providing the pleasure that normally flows from producing a new product.

It will also be apparent that although the soap shaver 3 in the preferred embodiment operates in a manner similar to a pencil sharpener, other devices are readily available to fracture the old bar of soap so as to permit portions thereof to be mixed with water.

We claim:

1. A soap forming toy, comprising:

means for shaving a piece of soap removing small pieces therefrom; and means permitting the mixing of the small pieces of soap that have been removed with water to form a paste-like soap material and thereafter introducing the paste-like soap material into a mold.

2. A soap forming toy as in claim 1, including a plurality of molds of different configuration.

3. A soap forming toy as in claim 2, wherein each of the molds includes a differently configured cavity, at least a portion of the cavity being made of a soft resin.

4. A soap forming toy as in claim 3, wherein said soft resin includes a mold release oil.

5. A soap forming toy as in claim 1, wherein said means for shaving the piece of soap comprises a shaft mounted for longitudinal movement, a pressing plate at one end of the shaft, a cutting element mounted for rotation, a spring normally urging the pressing plate towards the cutting element, the soap to be shaved being interposed between the pressing plate and the cutting element.

* * * * *